United States Patent
Balko et al.

(10) Patent No.: US 9,058,572 B2
(45) Date of Patent: Jun. 16, 2015

(54) TRANSACTION AWARE, FLEXIBLE INTERFACE FOR A STATE CORRELATION AND TRANSITION EXECUTION ENGINE

(75) Inventors: Sören Balko, Weinheim (DE); Matthias Miltz, Heidelberg (DE); Boris Klinker, Karlsruhe (DE)

(73) Assignee: SAP SE, Walldorf (DE)

( * ) Notice: Subject to any disclaimer, the term of this patent is extended or adjusted under 35 U.S.C. 154(b) by 1029 days.

(21) Appl. No.: 12/328,734

(22) Filed: Dec. 4, 2008

(65) Prior Publication Data

US 2010/0146243 A1 Jun. 10, 2010

(51) Int. Cl.
*G06Q 10/06* (2012.01)
*G06F 9/54* (2006.01)
*G06F 9/46* (2006.01)
*H04L 29/08* (2006.01)

(52) U.S. Cl.
CPC .............. *G06Q 10/06* (2013.01); *G06F 9/541* (2013.01); *H04L 67/32* (2013.01); *G06F 9/465* (2013.01)

(58) Field of Classification Search
USPC ................................................. 719/318, 320
See application file for complete search history.

(56) References Cited

U.S. PATENT DOCUMENTS

| | | | |
|---|---|---|---|
| 6,769,113 B1 * | 7/2004 | Bloom et al. ................. | 717/103 |
| 7,036,110 B2 * | 4/2006 | Jeyaraman .................... | 717/120 |
| 7,747,554 B2 * | 6/2010 | Hwang et al. .................. | 706/47 |
| 7,912,804 B1 * | 3/2011 | Talwar et al. .................. | 706/47 |
| 7,912,901 B2 * | 3/2011 | Chakra et al. ................. | 709/204 |
| 2002/0099634 A1 * | 7/2002 | Coutts et al. ................... | 705/35 |
| 2003/0093471 A1 | 5/2003 | Upton | |
| 2003/0200357 A1 * | 10/2003 | Yanosy ......................... | 709/328 |
| 2004/0078495 A1 * | 4/2004 | Mousseau et al. ............. | 710/1 |
| 2005/0222996 A1 * | 10/2005 | Yalamanchi ................... | 707/4 |
| 2007/0033273 A1 * | 2/2007 | White et al. ................... | 709/223 |
| 2007/0113217 A1 * | 5/2007 | Gish et al. ..................... | 717/120 |
| 2008/0294585 A1 * | 11/2008 | Hwang et al. ................... | 706/47 |
| 2009/0070786 A1 * | 3/2009 | Alves et al. ................... | 719/318 |
| 2009/0165021 A1 * | 6/2009 | Pinkston et al. .............. | 719/314 |

OTHER PUBLICATIONS

Reason et al, A Framework for Managing the Solution Life Cycle of Event-Driven Pervasive Applications, IFIP, 2006, pp. 479-488.*
Suda, Have your application call my application, Part 3: The resource adapter, IBM, Sep. 2006, pp. 1-41.*
Fan-Chao et al, Business Component Identification of Enterprise Information System: A hierarchical clustering method, IEEE, 2005, pp. 1-8.*

(Continued)

*Primary Examiner* — Diem Cao
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for state alignment and transaction coupling to enable reliable communication between an application, such as a backend system, and a correlation engine (or rules engine). In one aspect there is provided a method. The method may provide a first interface to receive information from an adapter for an application separate from a state correlation engine and provide a second interface to receive information from the state correlation engine to the adapter. The first and second interfaces may provide state alignment between the application and the state correlation engine. Related systems, apparatus, methods, and/or articles are also described.

19 Claims, 5 Drawing Sheets

(56) References Cited

OTHER PUBLICATIONS

Schiefer et al, Event-Driven Rules for SEnsing and Responding to Business Situations, ACM 2007, 8 pages.*

Rosenberg et al, Design and Implementation of a Service-Oriented Business Rules Broker, IEEE, 2005, pp. 1-9.*

Extended European Search Report dated Sep. 10, 2009, issued by the European Patent Office in connection with counterpart European application No. 09008211.6-1238.

Sun Microsystems: "J2EE Connector Architecture 1.0", Retrieved from the Internet: <URL:http://java.sun.com/j2ee/connector/download.html>, retrieved on Jul. 7, 2007, pp. 5-88, 98-124.

Open Service Oriented Architecture, "What is SCA?", retrieved from http://www.osoa.org/pages/viewpage.action?pageId=46, accessed on Dec. 4, 2008, pp. 1-2.

OSGi Alliance, "OSGi Framework Scope" OSGi, Wikipedia, the free encyclopedia, retrieved from http://en.wikipedia.org/wiki/OSGi, accessed on Dec. 4, 2008, pp. 1-6.

* cited by examiner

TRANSACTION AWARE, FLEXIBLE INTERFACE FOR A STATE CORRELATION AND TRANSITION EXECUTION ENGINE

FIELD

This disclosure relates generally to data processing and, more particularly, to aligning states of applications.

BACKGROUND

Event Condition Action (ECA) is an example of a rules-based approach used in an event driven system. Typically, the ECA rule includes an event part for specifying what triggers the invocation of the ECA rule, a condition part, which is a logical test that, if satisfied to true, causes the action to be carried out, and an action part, which includes updates or invocations on the local data at the database. In a database system, the condition could simply be a query to the database, with the result set being passed to the action part. Actions could also be calls to external programs or remote procedures. ECA rules can be used for activities such as automatically enforcing document constraints, maintaining repository statistics, facilitating publish/subscribe applications, and executing business processes.

SUMMARY

The subject matter disclosed herein provides methods and apparatus, including computer program products, for aligning states between the internal state of an ECA rules engine and external state held by components that interact with the ECA rules engine, with the alignment occurring transactionally (i.e., different transaction models are synchronized).

In one aspect there is provided a method. The method may provide a first interface to receive information from an adapter for an application separate from a state correlation engine and provide a second interface to receive information from the state correlation engine to the adapter. The first and second interfaces may provide state alignment between the application and the state correlation engine.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
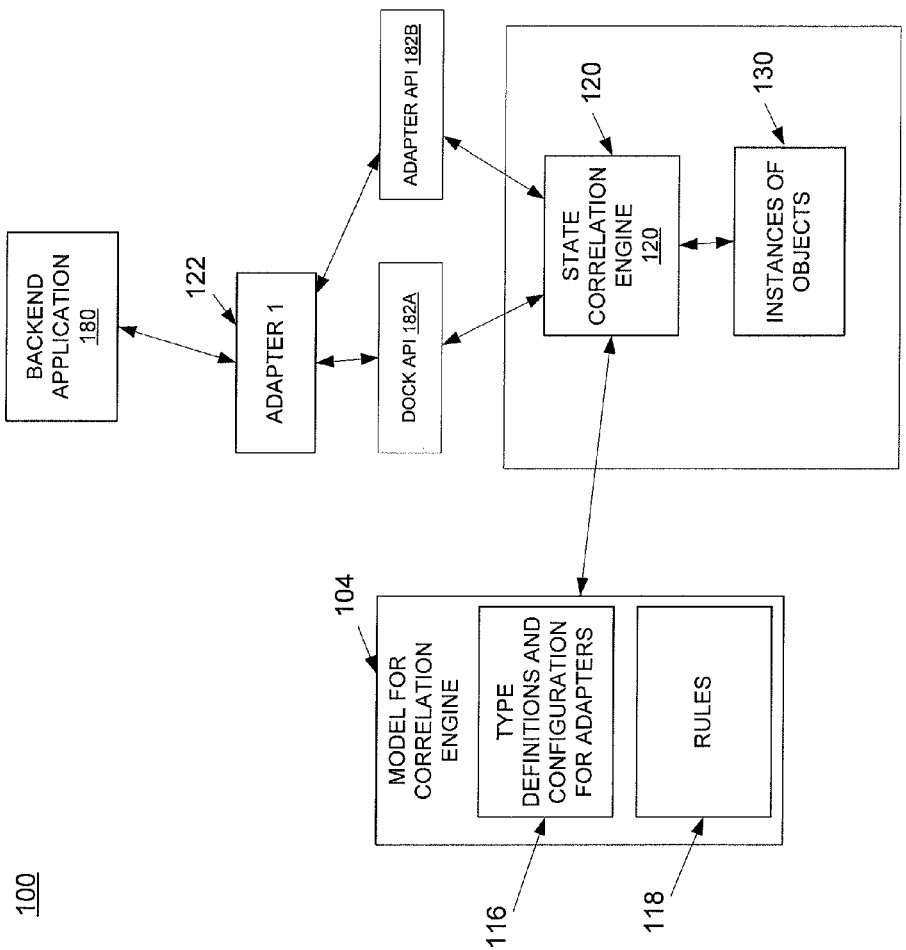
FIG. 1 illustrates a system 100 including an adapter and an interface.

FIG. 1 is a block diagram of a system 100 including one or more backend applications, such as an application 180, an adapter 122, a dock API (application programming interface) 182A, an adapter API 182B, a state correlation engine 120, instances of objects 130, and a model 104.

The state correlation engine 120 may execute models of a business process or other high-order paradigms that are represented by event-condition-action rules. The model 104 represents a set of ECA rules derived from a particular source model, which may be a business process. For example, business processes may be specified using different modeling languages, such as Business Process Modeling Notation (BPMN), BPEL (Business Process Execution Language), EPC (event-driven process chains), UML activity diagrams, and the like. The model 104 for a correlation engine may be mapped from other paradigms due to its use of basic building blocks from which modeling constructs of other modeling paradigms may be mapped.

The state correlation engine 120 (also referred to as a correlation engine or a rules engine) as described herein may be a component of a system that processes event-condition-action (ECA) rules that represent a business process. The state correlation engine 120 may process the ECA rules (also referred to herein as rules) to effectively correlate a state of execution of the process represented by results of execution of rules with new events (e.g., new, incoming events). For example, the state correlation engine 120 may be a component of a business process management (BPM) system, a complex event processing (CEP), a business activity monitoring (BAM) system, a business rules management (BRM) system, and any other system whose operational semantics can be natively represented as ECA rules.

In some implementations, the state correlation engine 120 may provide for continuous execution of rules by being continuous in the sense that execution of rules may be triggered by the execution of earlier rules which may result in further execution of rules. For example, a first rule R1 having a first action A1 may be executed as a result of a first event E1. Execution of the first rule R1 may result in the execution of the action A1, where the action A1 involves changing a state variable V1 from a value to another value. The event (E2) is the change of the state variable V1. The event E2 may be flooded in all rules, which may cause a second rule R2 to be executed, where the second rule R2 requires the event E2 before it is executed. As a result of the execution of R2, a second action A2 may be executed, which may result in an event E3, which may, in turn, cause another rule to be executed.

The state correlation engine 120 may further provide for stateful execution of rules in the sense that a state of execution may be retained across execution of rules (e.g., information about state may be retained across execution of rules and changed according to actions of rules or otherwise as a result of events).

Although the term event may be used in the following description to refer to an event object, which may be an object of an object-oriented or other type of data structure of another type of computer-implemented language (where the event object may be implemented as a combination of images of objects of a type language), the term event may also refer to an event in a broader sense, which may be an occurrence or happening. For example, an event may be the receipt of a message that may cause the generation of an event object (which may also be referred to as an event). Specifically, adapter 122 and the rules engine 120 operate on different event types. That is, the rules engine 120 exclusively processes events which are changes of state variables (e.g., before, after image pairs), as opposed to adapter 122 which processes external events originating from the backend application 180.

In general, operation of the system 100 may be as follows. The state correlation engine 120 may take the model 104 for a correlation engine as input and execute the model 104 with use of the adapter 122 that may provide connectivity to a backend application 180 (e.g., an enterprise resource planning (ERP) system, a task management system, a radio frequency identifier (RFID) system, an email server, and any other application). The model 104 for the state correlation engine 120 includes a combination of type definitions, configurations for adapters 116, and rules 118 (which are executed, at runtime, within, transactions).

The adapters, such as adapter 122, may connect the state correlation engine 120 with applications, such as backend application 180 (e.g., there may be an adapter to send and receive electronic mail or an adapter to consume web service calls). The adapter 122 adapts in the sense that it may provide a layer to transform communications between a correlation engine (e.g., state correlation engine 120) and outside components, such as other systems (e.g., application 180).

The adapter 122 may implement a corresponding "adapter" API 182B, and the state correlation engine 120 may implement a "dock" API 182A. The dock API 182A is responsible for communications from the adapter 122 to the state correlation engine; and the adapter API 182B is responsible for communications from the state correlation engine 120 to the adapter 122.

The APIs 182A-B each provide a flexible interface, such as an application programming interface (API), to allow the state correlation engine 120 to align its state to the state of so-called "external" applications, such as backend application 180, and to allow the external application to align its state with the state correlation engine 120. For example, the adapter 122 may call dock API 182A to provide state alignment by creating state variables, deleting state variables, setting attribute values of state variables, getting attribute values of state variables, and the like (e.g., calls, such as "createStateVariable", "deleteStateVariable", "setAttributeValue", and "getAttributeValue"). The state correlation engine 120 may call adapter API 182B to signal construction of state variables, destruction of state variables, changing of state variable attribute values, and also to invoke callbacks from within rule actions (e.g., calls, such as "onConstruction", "onDestruction", "valueChanged", and "invokeCallback").

The APIs 182A-B also facilitate lifecycle alignment. For example, the dock API 182A may be used by the adapter 122 to call the state correlation engine 120 to align lifecycles. Specifically, an adapter may use the dock API 182A to notify the state correlation engine 120 that the adapter is available (or unavailable) for receiving the signals, such as state variable construction, destruction, and the like. The dock API 182A calls may specifically include one or more of the following calls: "dock" and "undock", denoting that the adapter is available and unavailable, respectively. For example, the adapter API 182B may be used by the state correlation engine 120 to call the adapter 122 to align lifecycles with application 180 and may also include a mechanism to notify the adapter that the state correlation engine is temporarily unavailable to receive events. The adapter API 182B calls may include "enterRuntimeMode", "slumber", "wakeup", and "shutdown" to notify the adapter of a certain operational mode of the state correlation engine (such as recovery, deployment, or normal operations), to ask the adapter to temporarily cease its operations (due to a non-permanent unavailability of the state correlation engine) and to resume its normal operations afterwards, and to permanently shut down all operations (as part of a complete shutdown of the state correlation engine), respectively.

The APIs 182A-B also facilitate transactional configuration. For example, the adapter API 182B may be used by the state correlation engine 120 to call the adapter 122 to configure the adapter 122, and the calls may include one or more of the following: "configure" and "unconfigure." Moreover, the calls may transactionally push fragments of the adapter configuration model data 116 to the adapter 122. The adapter may then use this configuration data to further configure the connected backend application 180.

The APIs 182A-B may also be used to provide transaction coupling. For example, the adapter 122 may call the dock API 182A to control the lifecycle of an "internal" transaction (e.g., begin a transaction, to commit it, or roll it back, etc.) at state correlation engine 120 and to couple to an "external" transaction initiated by the connected backend application 180. The dock API 182 calls may include one or more of the following calls: "beginTransaction", "commit", "rollback", and "setPersistent" to start a new internal transaction, commit, or forcefully abort a (running) internal transaction, respectively. The state correlation engine 120 may call the adapter API 182B to couple internal transactions (i.e., internal to the state correlation engine) with the adapter 122 and corresponding application 180. In particular, the state correlation engine 120 will also transparently couple an external (adapter-side) transaction to the state correlation engine and invoke callbacks on the adapter to store, delete, and retrieve external state within that transaction. The adapter API calls may include one or more of the following: "persist", "eradicate", "recover", "evict", "depart", and "arrive", to store, delete, or retrieve external state in an (external) database transaction and to displace external state from main memory, prepare external state for being relocated to another node in a distributed ("cluster") environment, respectively.

Moreover, the state correlation engine may provide transaction coupling. For reliable execution of business logics, operations involving multiple components (e.g., a backend application and state correlation engine) may be executed with transactional guarantees. Specifically, transactional guarantees are provided in connection with bidirectional communication between state correlation engine 120 and backend application(s) 180 involving different data models and type systems for the affected state and different transaction models.

Execution of the model 104 for a correlation engine may be prompted by events received by an adapter 122 or in response to other stimuli (e.g., after start-up of the state correlation engine 120 as part of a recovery procedure and as a result of continuous execution of rules), although there is no explicit "start" operation per se which an adapter is aware of (e.g., the adapter is generally concerned with managing events, and even if a particular event delivered by an adapter 122 through the dock API 182A to the rule engine 120 causes rule(s) to be triggered, the adapter 122 is typically unaware of this effect). Execution of the model 104 by the correlation engine 120 may include evaluating conditions of the rules to determine actions to be performed and performing actions of the rules that correspond to conditions that are successfully evaluated.

As discussed above, the model 104 for a state correlation engine may include a combination of ECA rules, type definitions and configurations for adapters 116 and rules 118. A combination of condition networks, type definitions and configurations for adapters 116, and rules 118 may represent elements of a workflow model or another higher-order paradigm from which the model 104 for a correlation engine is derived. The type definitions 116 may be defined in accordance with an object-oriented language type system where different types of objects represent different types of events. For various reasons, such as performance reasons, the language may be limited with non-nested tuples (e.g., shallow structures of atomic values). Type definitions 116 may be adapter-governed such that a type definition may correspond to a type of event received by an adapter. However, the adapter may perform other actions upon receiving an event though the adapter API (which includes constructing a new instance of some type). The event itself denotes some "change" (e.g., creation, removal, attribute value update, and the like) of an object. Events are implicitly generated by the correlation state engine (or rules engine) if an adapter (or a rule action) performs an action (through the dock API 182A) to change an object. An adapter may optionally register to those events and perform custom actions. For instance, if an instance of some type of message is deleted, the adapter governing that type is notified and may then delete externally held data, which is associated to the particular message object instance, which was deleted. If that involves communicating to some backend application (e.g., a messaging system), the adapter will have to synchronize the different transaction models of the rule engine and the backend application via the dock API 182A.

The state correlation engine 120 offers an asynchronous, stateful execution mode operating on state changes (e.g., events) rather than the state variables itself. For events, each event may include a "before image" and an "after image" that reflect a committed state and a to-be-committed state. There are typically three types of events, namely create (or generate), delete, and, alter events. These events correspond to the information that a state variable was created, removed, or has changed its value.

An adapter configuration (included in component 116) may define a customization of an adapter to influence aspects of an adapter's runtime behavior. An adapter configuration may be a semi-structured data for custom interpretation by an adapter. As examples, an adapter configuration may include an address to which emails have to be sent; a web service endpoint and operation that is to be used in a web service call; mapping instructions (e.g., an extensible Stylesheet Language Transformation script) that are to be performed in a mapping step; and type information (e.g., as eXtensible Markup Language Schema Definition) that is used to hold business data.

The action scripts, which are part of the ECA rules, may result in events that update information of instances of types, where the events may include creating, deleting, or altering information of a type instance. In addition to updating information of instances of types, the transactions 118 may invoke functions on instances of types, which may include calling a custom functionality in an adapter that governs a type. Function invocations are part of rule actions (e.g., scripts). Functions that are part of transactions may be extension points (e.g., for adapters) to implement custom operations (e.g., these custom actions typically reflect functionality of the backend system to which the adapter connects to). Examples of custom operations that may be implemented as part of a function might include sending emails, invoking web services, delegating tasks, performing mappings (data transformations), and the like.

As discussed above, the state correlation engine 120 may execute the model 104 in response to an event generated by an adapter 122 or in response to other events representative of state change (e.g., the action part of another event-condition-action rule may cause an event). In addition to adapters receiving information to generate an event of state correlation engine 120, the adapter 122 and APIs 182A-B may be used to generate output and otherwise perform operations for the correlation engine 120. For example, execution of an action of a rule may cause an adapter to generate a web service call to another system. Specifically, a function invocation as part of a rule action script performs a callback to the adapter which may then perform that web service call (or any other operation).

As discussed above, the instances of objects 130 are instances of objects of an object-oriented language where different types of objects may represent different types of events or state attributes. The state of the state correlation engine is the entire set of state variables with their current attribute value. The instances may be used to make up computer-implemented events of the state correlation engine, where the computer-implemented events may have a combination of images including a before image of an instance including attributes of the instance before a change of state of the instance and an after image including attributes of the instance after a change of state of the instance. Events (in the sense of the rules engine) denote changes to state variables and exist for the duration of the transaction the change was made in. When the transaction is committed, the rules engine consults the events (which were implicitly constructed when the state variables were updated) to re-evaluate the conditions and disable rule actions whose condition is no longer valid and enable rule actions whose condition has become valid due to the state variable change. An event may be generated as part of a transaction or in response to the receipt of outside information that causes an event to be generated (e.g., an adapter may make changes to instances through the dock API resulting in events), and events may include generating, altering, or deleting an instance. For example, upon receiving a message from an external business system, a new instance of a type (e.g., a type "Message" defined as part of the type definitions 116) may be generated and a corresponding "create" event for the type may be generated (which may happen implicitly and no special activities apart from constructing the "Message" instance using the dock API is carried out by the adapter to have an event generated, where the event includes empty attributes for a before image and non-empty attributes for the after image, and where all or some of the attributes of the instance of "Message" type are transposed to the after image and only those attributes that change may be transposed to an image).

As an example of implementation of a business process to be executed by the state correlation engine 120, the state correlation engine 120 may perform a correlation between subscribers and published messages, which may be referred to as message correlation. In particular, multiple consumers may receive a message based on individual correlation criteria. For example, each party of a messaging system including one or more enterprise systems may specify messages it wants to receive by using a "Subscription" object having a "customer_id" attribute whose value must match a respective counterpart in the "Message" objects.

The subject matter described herein relates to a transactional state correlation for continuous evaluation of eventcondition-action (ECA) rules, which offers the expressiveness to support diverging business scenarios, such as business process management (BPM), complex event processing (CEP), business activity monitoring (BAM), business rules management (BRM), and so forth. These scenarios rely on externalized events to trigger evaluation of an ECA rule or to propagate the result of these rules to another software component. Specifically, each of the business scenarios may interact with heterogeneous backend systems, such as enterprise resource planning (ERP) applications, radio frequency identification (RFID) readers, task management software, email, servers, and the like, to receive and/or provide events. Moreover, the interaction between business applications needs to be safeguarded by transactional guarantees to enforce ACID compliant business transactions. However, it may be problematic to interface to the state correlation engine to exchange events with arbitrary heterogeneous backend applications. To that end, the subject matter described herein provides, in some implementations, interfaces, such as APIs 182A-B, to provide a mechanism for mediating between internal state variables of the state correlation engine 120 and external events (e.g., from the backend application 180), which may rely on different data models and type systems (e.g. a relational model vs. an object-oriented data model, etc).

Moreover, the subject matter described herein provides, in some implementations, a mechanism for aligning the different models 104 of the state correlation engine 120 with the external applications, such as backend application 180. For example, internal transactions (e.g., internal to a state correlation engine 120) and external transactions (of the backend applications) are synchronized (which may include joint save points and recovery of internal states and external, backend system states), as a prerequisite for supporting failover and cluster-awareness protocols of a state correlation engine. Although a state correlation 120 may be part of a BPM system or an ERP system, the state correlation 120 may be implemented independently of the BPM and ERP systems as well.

The subject matter described herein may also provide a protocol to make that alignment. For example, an alignment of the lifecycle of the state correlation engine 120 with the connected backend application 180 may be implemented and the internal/external state alignment may be performed as well.

Furthermore, the subject matter described herein may provide a way of propagating a configuration (e.g., included component 116 of model 104) to an adapter 122 which may wrap a backend application 180. The adapter and backend application configuration is part of a complex scenario potentially involving rules and configurations for multiple adapters and backend applications. The adapter API 182B provides a way of handing over the relevant piece of configuration to the respective adapters and establishing transactional guarantees (i.e., establishing atomicity and consistency) around it. That is, if one adapter (or the state correlation engine including rule engine) fails to accept a given piece of configuration, the remaining adapters will not adopt their configuration fragments (which were handed over in the same transaction) either, i.e., the configuration transaction aborts and its effects roll back.

Generally, the subject matter described herein may provide a connectivity framework (i.e., system) for the state correlation engine 120. This connectivity framework provides adapters, such as adapter 122, to the state correlation engine 120 (e.g., to connect, make a call to, and the like). Specifically, the adapter 122 may implement a standardized adapter API 182B to receive events from the state correlation engine 120 to one or more of backend applications, and invokes functions of the standardized dock API 182A, which is implemented by the state correlation engine to push events from the one or more backend applications to the state correlation engine 120.

Moreover, system 100 may include an internal type module to uniquely assign a type to a single adapter. For example, the adapter 122 controls (e.g., is responsible for) events related to the assigned type, which includes (1) propagating events to the state correlation engine 120 when triggered from a backend application 180 (e.g., using the "dock API" interface 182A) and (2) propagating the events to the backend application 180 when raised in the state correlation engine 120 (e.g., received through the adapter API interface 182B). A feature, in some implementations, of the subject matter described herein is performing these event mediations in a transactional (e.g., ACID-compliant) manner. Moreover, the alignment (e.g., synchronization of transactions) between a backend application and a state correlation engine works in both directions (e.g., if the adapter receives an event from a backend system, the adapter transforms the event into an instance of an internal type system and opens a new state correlation engine transaction to deliver this event to the correlation engine 120). The adapter also needs to mark the newly opened internal (engine) transaction as persistent to enforce the transaction coupling. The latter is, of course, only necessary if the backend application has invoked the adapter within an external transaction. In some boundary use-cases (e.g., best-effort message delivery), backend applications may interact with adapters in a non-transactional manner.

The APIs 182A-B described herein are thus implemented to enable state correlation engine 120 transactions to participate in the backend application 180 transactions and vice-versa.

In addition, the APIs 182A-B described herein are each configured to support state displacement (e.g., eviction of state variables from main memory) and recovery (e.g., re-entry of state variables into main memory), which is a prerequisite for failover guarantees and cluster-awareness. For example, the state correlation engine 120 may mark a transaction as "persistent" (e.g., where the default for a transaction is transient-only execution), enforcing thus a database save point, where both the internal state (e.g., internal to state correlation engine 120) and external state (e.g., of backend application 180) is written to a database, although this is a side effect of transaction synchronization. Moreover, the state correlation engine may autonomously open an "external" (database) transaction, thus, having the same effect as in transaction coupling.

Moreover, the state correlation engine 120 may include multiple triggers to trigger a save point. As opposed to adapters requiring a save point through transaction coupling, these triggers are "internal", i.e., the rules engine itself initiates coupling an internal transaction to an "external" database transaction, thus enforcing a save point which aids to support transactional coupling. These triggers may include one or more of the following: eviction (e.g., displacement of state from main memory to disk to save resources); state transport across a cluster; and failover (e.g., persist the effects of transactions which interact with a backend application and cannot thus be repeated). In addition, the state correlation engine 120 may access the adapter to which is linked to an (internal) state variable (e.g., of a backend application) and to re-establish the complete system state based on a save point.

The adapter may also handle lifecycle events of the backend application(s) and the state correlation engine. The adapter may register at, and un-register from, the state correlation engine 120 if the backend system starts up (or, e.g., shuts down). Likewise, the adapter is notified if the rule engine is temporarily unable to serve requests, such as receive events through the "dock" API 182A.

The subject matter described herein also supports setting up an entire scenario, which may be required (i.e., besides declaring the types and deploying the ECA rules to the engine itself) to configure the connected backend application to a particular scenario (e.g., a complex event processing scenario, where incoming RFID signals are tracked and aggregated, requiring an adapter to the backend application, which sends the RFID signals to configure the RFID readers from which signals are received). The configuration (e.g., included in module 116) of an adapter is part of a transactional deployment mechanism, enabling the adapter to autonomously roll-back deployment if the received configuration cannot be handled by the connected backend system.

Figure 2A:
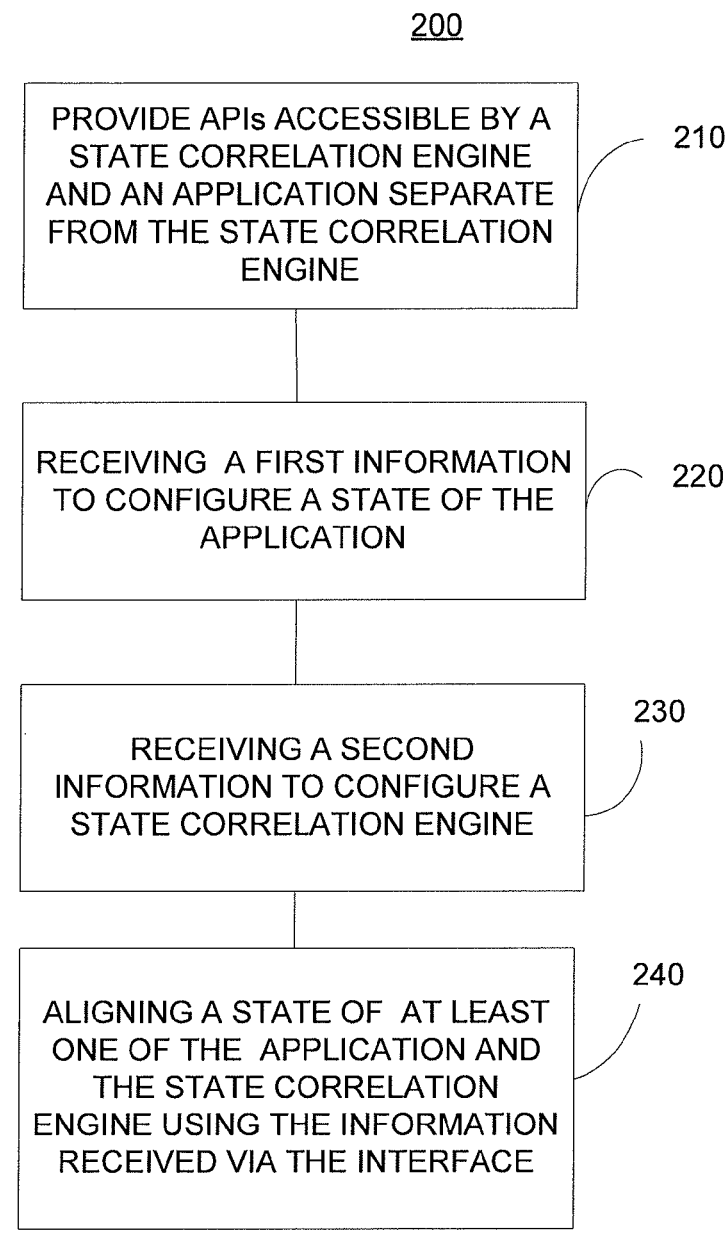
FIG. 2A illustrates a process 200 for using system 100 to align the transactions between an application and a state correlation engine.

FIG. 2A depicts a process 200 for aligning the states of the state correlation engine 120 and a backend application using an adapter including an interface, such as an API. The description of FIG. 2A will also refer to FIG. 1.

At 210, an interface is provided. The dock API 182A is provided by the state correlation engine 120 and used (e.g., called) by the adapter 122, and the adapter API 182B is provided by the adapter 122 and used by the state correlation engine 120. That is, the dock API 182A may act as an abstraction of the state correlation engine (to the adapter), whereas the adapter API 182B may act as an abstraction of the adapter (to the state correlation engine). The dock API 182A passes information to the state correlation 120, wherein the state correlation engine 120 passes information to the adapter 122 and indirectly also to the external application via adapter API 182B. Backend application 180 is separate from applications associated with the state correlation engine 120. For example, the backend application 180 may be an email server, and the state correlation engine 120 may be associated with a BPM system. The backend application 180 and state correlation engine 120 are de-coupled components with different life-cycles. The adapter 122 is another so-called "in between" application (potentially having even another lifecycle than the backend application), which bi-directionally interfaces the state correlation engine 120 and the backend application 180 through protocols represented by the dock API and the adapter API. Moreover, the adapter 122 may implement the adapter API 182B and docks in into the state correlation engine 120 using the dock API 182A to be operational.

At 220, an interface, such as adapter API 182B, receives from the state correlation engine 120 information to alter a state of the application 180. For example, adapter API 182B associated with adapter 122 may receive information, such as a transaction ticket (e.g., a technical representative of an internal transaction), state information (of, e.g., a fragment of the system of state correlation engine 120), calls to invoke one or more methods at the adapter 122, and the like. In the case of the adapter configuration case (i.e., transactional deployment), the state correlation engine 120 may provide semi-structured configuration data to the adapter 122 via adapter API 182B (which is usually some technical configuration that customizes existing functionality of the adapter 122 or the connected backend application 180).

At 230, an interface, such as dock API 182A, receives information from the adapter 122, which wraps the backend application 180. The received information is used to alter a state of the state correlation engine 120 (e.g., create a new instance of a state variable). In the case of this so-called "in-flight" use-case (i.e., transaction synchronization and state coupling), this step 230 may denote a case where the backend application 180 first accesses the adapter 122 to signal a event that has happened on the backend application side. The adapter 122 then re-formulates and filters the received information to fit the state correlation engine 120 type system and then passes on the adapted information to the state correlation engine 120 through the dock API 182A.

At 240, the state of the application 180 and/or the state correlation engine 120 are configured to provide an alignment. For example, the adapter 122 may change state variables internal to the state correlation engine 120 through dock API 182A to correspond reflect changes on the external state, and the adapter 122 changes external state when changes to internal state variables are received through adapter API 182B.

An adapter may be responsible for a single backend application. The adapter 122 may also include one or more of the feature described below. To illustrate these features, the following provides an example, which refers to an adapter for a task inbox (e.g., a task inbox adapter). The task inbox refers to a task list (e.g., of work items), which is presented via a user interface to a user. A work item may be represented by an object, which includes attributes such as a due date, a subject, a processor role assignment, etc. For example, the object may include the state information of the task itself (e.g., a new task, an in-progress task, a completed task, and so on), and who is actually supposed to carry out the task. In some implementations, the primary, if not the only purpose, of the task inbox adapter (which would be implemented as an adapter 122) is to synchronize these states with the task inbox (which acts as backend application 180) regardless of whether the change to that state occurs in the state correlation engine 120 or in the task inbox application 180. Specifically, if an state variable representing the task is created within the state correlation engine 120, the task inbox 180 must be notified to create a corresponding work item. Similarly, if the task state variable is removed, the task in box work item would also be deleted. In that sense, the task adapter 122 aligns the external state (e.g., work items held by the task inbox 180) and corresponding internal state variables of the state correlation engine 120.

Figure 2B:
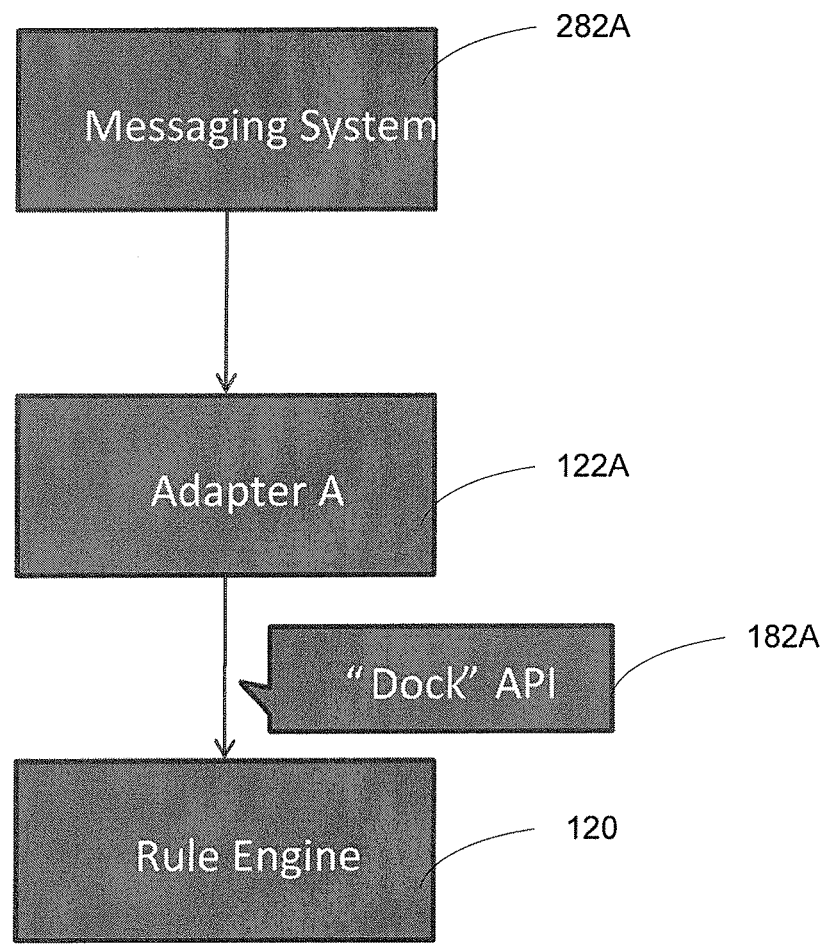
FIG. 2B-C depict systems for aligning using an adapter and interfaces, such as APIs.
Figure 2C:
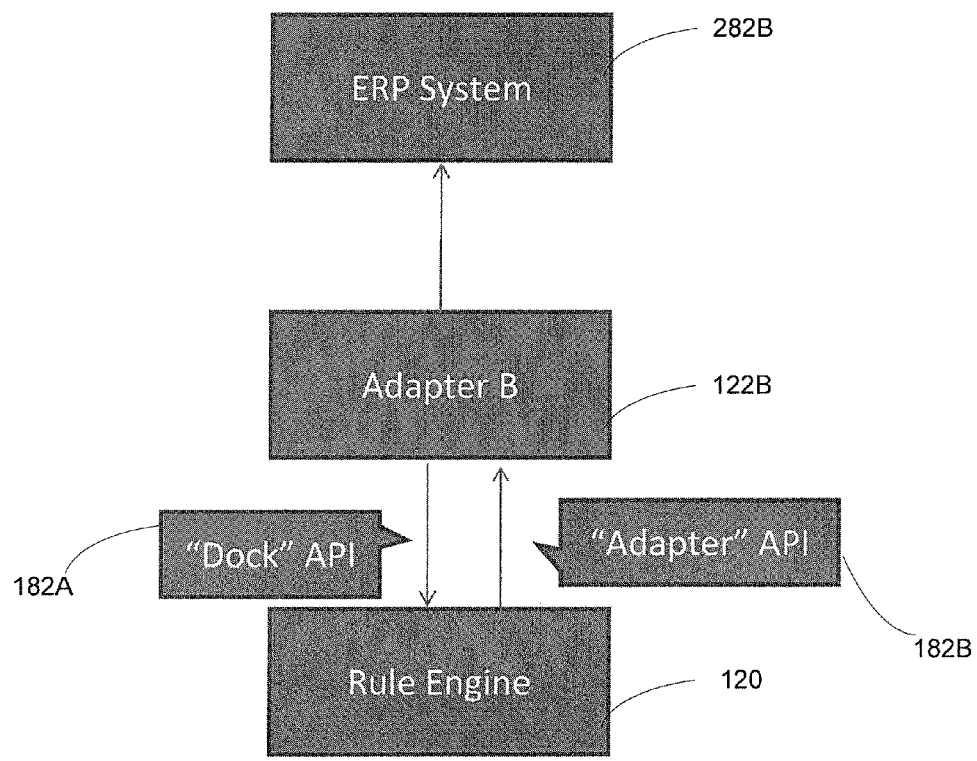

FIGS. 2B-C depict a business process which is started from a web service call and consumes another asynchronous, reliable web service of a backend ERP system. The adapter 122A manages incoming web service calls (e.g., to start a process). Specifically, adapter 122A may govern a type "Request" which represents an incoming web service call; connects to the messaging system 282A, which reliably (i.e., within a database transaction) delivers the "payload" of an incoming web service call to the adapter 122A; and as part of that constructs an instance of the "Request" to fill in two attribute values (namely, web service operation and endpoint URL), while an XML payload is held as external state at adapter 122A side (i.e., the XML payload represents the external state)

The adapter 122B manages outgoing web service calls. Specifically, the adapter 122B governs the type "Call" which represents an outgoing web service call and connects to an Enterprise Resource Planning (ERP) backend application system 282B and invokes asynchronous reliable web service to deliver the call parameters.

FIG. 2B depicts a so-called "incoming message" from a backend application implemented as a messaging system 282A. The messaging system 282A opens a database transaction T1 and synchronously calls adapter 122A to deliver a message to state correlation engine 120 (labeled as rule engine). Next, adapter 122A opens an internal transaction T2, marks this T2 as persistent (thus enforcing coupling to T1), constructs a "Request" instance and commits T1 using the dock API 182A. Next, the state correlation engine 120 reevaluates conditions (as part of the ECA rules 118) with a "create" event of "Request" instance; couples T2 to T1 by temporarily holding back the final "commit" of T2; ultimately materializing changes done within T2 until T1 is ultimately committed (through "commit" callback mechanism of JPA). The messaging system 212A then commits T1, which implicitly also commits T2.

FIG. 2C depicts a so-called "outgoing message" from state correlation engine 120 to a backend application implemented as an ERP system 282B. The state correlation engine 120 (labeled as rule engine) executes an action script within internal transaction T3 which constructs a "Call" instance and performs a callback function, such as "call:invoke(<parameter>)." Next, instance creation "new Call ( . . . )" and function invocation are received through adapter API 182B (through, e.g., "on Construction" and "invokeCallback" methods of the adapter API 182B). ERP system 282B receives the calls and internally opens a new database transaction T4 to reliably (i.e., safeguarded through a database transaction) execute the business logics associated with the call. The adapter marks T3 as "persistent" using dock API 182A, thus enforcing coupling T4 to T3. The state correlation engine 120 automatically commits T4 upon commit of T3.

Figure 3:
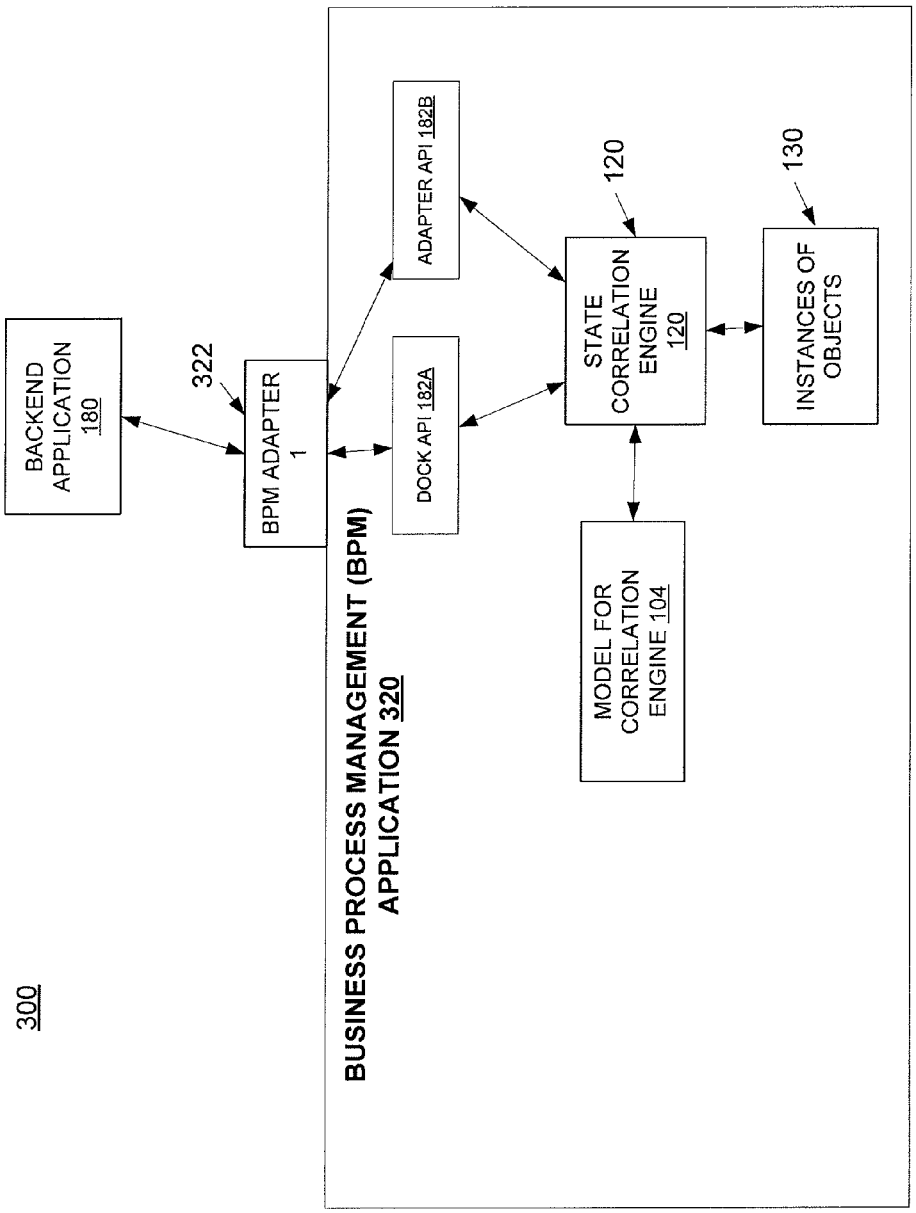
FIG. 3 illustrates another system 300 including an adapter and interfaces.

FIG. 3 depicts a system 300. System 300 is similar to system 100 in many respects. However, system 300 is a variation of system 100 which is tailored for business process management. System 300 implements adapter 122 as BPM (business process management) adapter 322 to connect a business process administration backend application to the state correlation engine. BPM adapter 322 implements the adapter API 182A, which includes one or more of the following methods: a name getter method (for providing a unique identification of the adapter to the state correlation engine), a configuration method, an un-configuration method, a runtime node notification method, lifecycle control methods such as an enter runtime mode method, a shutdown method, a slumber method, a wakeup method, all which are further described below.

The BPM adapter 322 also includes a runtime node notification method (e.g., called as enterMode (RuntimeMode mode)). For example, this method may be used for notifying the adapter of a runtime mode switch. There may be runtime modes of the state correlation engine denoting certain operational states, such as normal, recovery, deployment, etc. The state correlation engine 120 may indicate to the adapter to be unavailable or available.

The BPM adapter 322 may also include a configuration method and a un-configuration method. This configuration method and/or the un-configuration method may be called whenever necessary, but is typically called at least once during the docking of the adapter to the BPM application. These are functions of the adapter API 182B (e.g., the "configure" methods hands over semi-structured configuration data to the adapter API 182B as part of a scenario deployment and vice-versa, and the unconfiguration method revokes this data by notifying the adapter that this piece of configuration is no longer valid).

The BPM adapter 322 may also include other lifecycle controls. For example, the BPM adapter 322 may couple to a state correlation engine 120 of BPM application 320. The BPM adapter 322 may function in conjunction with the two lifecycles of the internal BPM side and the adapted, external side of backend application 180 (which is a business process administration system, in this case). These lifecycles are normally controlled by a framework (i.e., a system), and the BPM adapter 322 is started when both internal and external systems are running. The BPM application 320 runtime offers an optional third lifecycle, which originates from the fact that the state correlation engine 120 may replace its own internal states at runtime (e.g., as part of its cluster-enablement protocols), without triggering a full lifecycle management restart.

Examples of the lifecycle control methods include: the adapter 322 indicates to the state correlation engine 120 to be available or unavailable (e.g., through a dock call or an undock call of the dock API 182A); the state correlation engine 120 indicates to the adapter 322 to forcefully shut down (e.g., using a shutdown call of the adapter API 182B) or notifies the adapter 322 to be unavailable (e.g., through an enterRuntimeMode( ) call of the adapter API 182B); and the state correlation engine 120 notifies the adapter 322 to temporarily sign off (e.g., using a slumber( ) call and a subsequent wakeup( ) call of the adapter API 182B) without needing to fully restart the adapter 322 during the slumber( ) . . . wakeup( ) call sequence, although the state correlation engine may itself restart. To adhere to these transient restarts, the BPM adapter 322 typically includes a slumber method and a wakeup method.

The slumber method call represents that the BPM application 320 runtime will go away temporarily (e.g., stop serving or responding to requests) so that the adapter 322 can undock itself and a shutdown of the BPM application 320 will be called in a controlled manner in the same call stack (which can be detected), or the adapter 322 can ignore the slumber method, and the adapter shutdown will be called at a later point. The wakeup method call represents that the runtime of the BPM application 320 has returned, and the BPM application 320 is configured to service docking requests. In most cases, nothing (e.g., interfaces, objects, etc) may be cached between slumber and wakeup, as these are no longer valid when the runtime returns.

Docking the BPM adapter 322 to the BPM application 320 runtime is the first contact between BPM adapter 322 and BPM application 320. A so-called "docking port" (which is implemented by the dock API 182A) may be found in a Java Naming and Directory Interface (JNDI) registry. The dock API 182A includes a method, referred to as "dock," which takes the BPM adapter 322 as a parameter. After a successful docking procedure (which may include zero-to-many configuration calls, which the state correlation engine does on the newly docked adapter through the adapter API 182B), a handle object will be returned, which allows the BPM adapter 322 to further access BPM application 320 and its module (or subsystems), such as a transition manager through the "dock" API 182A. In this regard, the dock API 182A is used in a way that the dock call is the first thing which happens before other functionality of the dock API may be invoked. During the call to dock the BPM adapter 322, a configuration method at BPM adapter 322 is called with one or more of the following parameters: the types 116 the adapter governs (which have been assigned to the BPM adapter 322); a specific configuration for the BPM adapter 322; a transaction ticket representing the transactional context of the configuration procedure; and the reason the configuration procedure is being called. The BPM adapter 322 would also have checks to confirm the BPM adapter configuration, so that only acceptable configurations would be allowed. If the BPM adapter configuration is not allowed (and thus invalid), the BPM adapter 322 may send a message (which raises an exception which implicitly lets the internal transaction roll back). The adapter exception message may thus cause a transaction to rollback.

Moreover, the BPM adapter 322 configuration can be called (or invoked) multiple times during a given docking operation. In addition, the configuration method may also be called for the reason of a deployment (e.g., whenever new information has been deployed, new types deployed, and/or new configurations deployed). The transactional context of the state correlation engine 120 is typically handled during the configuration calls. During the call, the kernel execution system of BPM application 320 may (and most likely will) continue process execution, during which adapters 322 may be called via adapter API 182B. Therefore, executional parts of the BPM adapter 322 may not operate on not yet committed BPM types of BPM application 320 (or on not yet committed configurations). There are different transactional contexts (also referred to as transition ticket) for "configure" calls. In other words, the dock API 182A provides means to handle the configuration call transactionally. Specifically, the dock API 182A allows for implementing a two-phase commit strategy which will only let the adapter materialize (e.g., make visible for other concurrently running transactions) the received configuration data once other affected adapters have successfully prepared the commit.

Moreover, in some implementations, BPM application 320 may include a set of BPM types which may be examined and checked by BPM adapter 322 for required attributes, such as names, types, and the like, methods (including e.g., parameters, return type, names, etc), or other features used during operation. This is an adapter-side validation of types, which requires the adapter 322 to check types and configuration received during the configure call. If one of those does not match the adapter's expectations, the transaction is ultimately rolled back. Each type may also be supplied with an invocation handler and a persistency handler, which are a flexible part of the adapter API for state alignment and transaction coupling purposes.

Furthermore, BPM application 320 may include a persistency handler, which may be called whenever an object is being persisted (e.g., to allow the BPM adapter 322 to have its own supplemental persistence to persist externally held state which is associated to particular internal state variables). The adapter 322 may either persist the external state on its own or, alternatively, leverage other functionality of the wrapped backend system to invoke the persistence. The persistence handler may be used by the BPM adapter 322 to recover its adapter-held external state (if any) from persistence.

In some implementations, the BPM adapter 322 includes an adapter specific configuration (see, e.g., type definitions and configurations for adapters 116). The configuration specific to an adapter may be presented through a tree-based structure, where each level has a set of key-value pairs, as well as a set of named substructures.

In some implementations, the BPM adapter 322 may support recovery. When that is the case, if the BPM adapter 322 maintains its own external state, which depends on a set of objects. The BPM adapter 322 may also register, during configuration, a displacement handler (which is also part of the adapter API 182B) tailored for transactional coupling in the context of a cluster-enablement protocol where both internal state variables and associated external state may need to be moved from one cluster node to another. After configuration of the BPM adapter 322, the displacement handler's "arrive" method may be called for the extension of a type (all instances of the type which is governed by the adapter) for that particular class, at which point the BPM adapter 322 rebuilds the external state associated to those state variable instances. During these calls, the BPM adapter 322 queries any database tables related to the BPM adapter's internal structure, so that the adapter 322 is free to query a database (or any other data source) to build up the external state associated to an internal state variable, which has arrived at this cluster node. In the case of a state variable (e.g., a BPM object) sent from a given cluster node due to a request by another node, the displacement handler's "depart" method is called. In the case of a given object becoming inactive and the resources are released for this, an "evict" method is called. The persistence handler's methods are called when, for example, objects take part in persistence actions, such as when the object becomes persisted or eradicated to free up resources currently occupied by this state variable and the associated external state.

The adapters, such as BPM adapter 322 (which have registered persistence handlers), may have its persist method and eradicate method called with an open (external) database transaction (e.g., a JPA transaction that is automatically opened and coupled to the internal transaction by the rule engine), when objects are persisted and deleted, respectively, to let the adapter maintain separate supplementary database tables (which includes the externally held state). If the internal transaction is opened by the adapter 322 itself (e.g., as opposed to being invoked through the invocation handler with an already open transaction), a persistency callback may be registered as well. This persistency callback will be called during the prepare phase with an open database transaction, although not necessarily in the same thread of control (or other like lightweight process). In some (if not all) implementations, externally held state may be persisted to a database if the rule engine does not decide to do so, otherwise the adapter's state may become out of synch with the state of the kernel (which may cause errors if a recovery occurs).

As described above, triggering events are done in an internal (e.g., to main memory) transaction, which is accessible through the dock API at dock-time. The opposite form of persistency synchronization is demonstrated in the send message method realized through a function callback as part of the adapter API. In this case, the messaging layer expects an open transaction to synchronize to ensure that a reliable path is maintained.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

Although ordinal numbers such as first, second, and the like may, in some situations, relate to an order; as used in this document ordinal numbers do not necessarily imply an order. For example, ordinal numbers may be merely used to distinguish one item from another. For example, to distinguish a first event from a second event, but need not imply any chronological ordering or a fixed reference system (such that a first event in one paragraph of the description may be different from a first event in another paragraph of the description).

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure a processor to perform a method, the method comprising:
   providing a first interface to receive information from an adapter for an application separate from a state correlation engine, wherein the adapter connects the application and the state correlation engine; and
   providing a second interface to receive information from the state correlation engine to the adapter, the first and second interfaces providing state alignment between the application and the state correlation engine, the state correlation engine providing the state alignment by calling the adapter using the second interface to cease or resume operation of the adapter based on an operational mode of the state correlation engine, the operational mode including one or more of a recovery mode and a deployment mode, the state alignment changing one or more state variables in the state correlation engine to reflect a state change to the application or changing a state of the application to reflect a change to the one or more state variables in the state correlation engine,
   wherein the state correlation engine uses a model for the state correlation engine as an input and executes the state correlation engine model and with the adapter provides connectivity to the application, wherein the model is executed with at least one transactional guarantee for a bidirectional communication between the state correlation engine and the application and in response to at least one of the following: an event generated by the adapter and an event representative of the changing of the one or more state variables of the state correlation engine, the model including a combination of at least one of the following: a type definition, a configuration for the adapter, and a runtime execution rule, and
   wherein the state correlation engine is further configured to call the adapter using the second interface, the call including configuration data to configure the adapter, and the adapter using the configuration data to configure the application.

2. The non-transitory computer-readable medium of claim 1, wherein the first and second interfaces further provide transactional coupling between the application and the state correlation engine.

3. The non-transitory computer-readable medium of claim 1, wherein the first and second interfaces are accessed to provide an alignment of a lifecycle between the application and the state correlation engine, wherein the adapter controls lifecycle for an internal transaction at the state correlation engine and couples to an external transaction initiated by the application.

4. The non-transitory computer-readable medium of claim 3, wherein providing the alignment of the lifecycle includes accessing the first interface to provide, to the state correlation engine, a notification of whether or not that the adapter is available.

5. The non-transitory computer-readable medium of claim 1, wherein the call transactionally deploys a configuration to the adapter to customize the behavior of the adapter and the application.

6. The non-transitory computer-readable medium of claim 1, wherein providing state alignment between the application and the state correlation engine includes the first and second interfaces providing a bi-directional exchange of events between the adapter and the state correlation engine and to couple an internal transaction to an external transaction.

7. The non-transitory computer-readable medium of claim 1, wherein at least one of the adapter and the first interface are further configured to transform the information received at the first interface into an adapted event using the type definition of the model,
   wherein the event generated by the adapter and the event representative of the state change of the state correlation engine are based on the adapted event, and
   wherein the executing of the state correlation engine model changes the one or more state variables of the state correlation engine in accordance with the runtime execution rule.

8. A computer-implemented method comprising:
   providing a first interface to receive information from an adapter for an application separate from a state correlation engine, wherein the adapter connects the application and the state correlation engine; and
   providing a second interface to receive information from the state correlation engine to the adapter, the first and second interfaces providing state alignment between the application and the state correlation engine, the state correlation engine providing the state alignment by calling the adapter using the second interface to cease or resume operation of the adapter based on an operational mode of the state correlation engine, the operational mode including one or more of a recovery mode and a deployment mode, the state alignment changing one or more state variables in the state correlation engine to reflect a state change to the application or changing a state of the application to reflect a change to the one or more state variables in the state correlation engine,
   wherein the state correlation engine uses a model for the state correlation engine as an input and executes the state correlation engine model and with the adapter provides connectivity to the application, wherein the model is executed with at least one transactional guarantee for a bidirectional communication between the state correlation engine and the application and in response to at least one of the following: an event generated by the adapter and an event representative of the changing of the one or more state variables of the state correlation engine, the model including a combination of at least one of the following: a type definition, a configuration for the adapter, and a runtime execution rule, and
   wherein the state correlation engine is further configured to call the adapter using the second interface, the call including configuration data to configure the adapter, and the adapter using the configuration data to configure the application.

9. The computer-implemented method of claim 8, wherein the first and second interfaces further provide transactional coupling between the application and the state correlation engine.

10. The computer-implemented method of claim 8, wherein the first and second interfaces are accessed to provide an alignment of a lifecycle between the application and the state correlation engine, wherein the adapter controls lifecycle for an internal transaction at the state correlation engine and couples to an external transaction initiated by the application.

11. The computer-implemented method of claim 10, wherein providing the alignment of the lifecycle includes accessing the first interface to provide, to the state correlation engine, a notification of whether or not that the adapter is available.

12. The computer-implemented method of claim 8, wherein the call transactionally deploys a configuration to the adapter to customize the behavior of the adapter and the application.

13. The computer-implemented method of claim 8, wherein providing state alignment between the application and the state correlation engine includes the first and second interfaces providing a bi-directional exchange of events between the adapter and the state correlation engine and to couple an internal transaction to an external transaction.

14. A system comprising:
a processor; and
a memory, the processor and memory configured to perform a method comprising:
providing a first interface to receive information from an adapter for an application separate from a state correlation engine, wherein the adapter connects the application and the state correlation engine; and
providing a second interface to receive information from the state correlation engine to the adapter, the first and second interfaces providing state alignment between the application and the state correlation engine, the state correlation engine providing the state alignment by calling the adapter using the second interface to cease or resume operation of the adapter based on an operational mode of the state correlation engine, the operational mode including one or more of a recovery mode and a deployment mode, the state alignment changing one or more state variables in the state correlation engine to reflect a state change to the application or changing a state of the application to reflect a change to the one or more state variables in the state correlation engine,
wherein the state correlation engine uses a model for the state correlation engine as an input and executes the state correlation engine model and with the adapter provides connectivity to the application, wherein the model is executed with at least one transactional guarantee for a bidirectional communication between the state correlation engine and the application and in response to at least one of the following: an event generated by the adapter and an event representative of the changing of the one or more state variables of the state correlation engine, the model including a combination of at least one of the following: a type definition, a configuration for the adapter, and a runtime execution rule, and
wherein the state correlation engine is further configured to call the adapter using the second interface, the call including configuration data to configure the adapter, and the adapter using the configuration data to configure the application.

15. The system of claim 14, wherein the first and second interfaces further provide transactional coupling between the application and the state correlation engine.

16. The system of claim 14, wherein the first and second interfaces are accessed to provide an alignment of a lifecycle between the application and the state correlation engine, wherein the adapter controls lifecycle for an internal transaction at the state correlation engine and couples to an external transaction initiated by the application.

17. The system of claim 16, wherein providing the alignment of the lifecycle includes accessing the first interface to provide, to the state correlation engine, a notification of whether or not that the adapter is available.

18. The system of claim 14, wherein the call transactionally deploys a configuration to the adapter to customize the behavior of the adapter and the application.

19. The system of claim 14, wherein providing state alignment between the application and the state correlation engine includes the first and second interfaces providing a bi-directional exchange of events between the adapter and the state correlation engine and to couple an internal transaction to an external transaction.

* * * * *